(12) United States Patent
Sommer et al.

(10) Patent No.: US 7,180,828 B1
(45) Date of Patent: Feb. 20, 2007

(54) NON-KINKING OIL-FILLED ACOUSTIC SENSOR STAVE

(75) Inventors: Keith E. Sommer, Satellite Beach, FL (US); Henry P. Stottmeister, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 303 days.

(21) Appl. No.: 10/829,615

(22) Filed: Apr. 22, 2004

(51) Int. Cl.
*G01V 1/20* (2006.01)
(52) U.S. Cl. .................................... 367/154; 367/153
(58) Field of Classification Search ................. 367/5, 367/6, 153, 154
See application file for complete search history.

(56) References Cited

U.S. PATENT DOCUMENTS

| | | | | |
|---|---|---|---|---|
| 2,837,731 A | * | 6/1958 | Harris | 367/154 |
| 3,141,148 A | * | 7/1964 | Hueter | 367/153 |
| 3,982,144 A | | 9/1976 | Rogers et al. | |
| 4,656,616 A | * | 4/1987 | Bennett et al. | 367/153 |
| 4,685,090 A | * | 8/1987 | Krevor | 174/101.5 |
| 4,745,584 A | | 5/1988 | Anderson | |
| 4,862,428 A | * | 8/1989 | Jackett et al. | 367/155 |
| 5,220,538 A | | 6/1993 | Flanagan et al. | |
| 5,499,219 A | * | 3/1996 | Brenner et al. | 367/154 |
| 5,894,651 A | | 4/1999 | Dvorsky et al. | |
| 6,208,584 B1 | | 3/2001 | Skinner | |

* cited by examiner

*Primary Examiner*—Ian J. Lobo
(74) *Attorney, Agent, or Firm*—Howard Kaiser

(57) ABSTRACT

A hydrophone stave comprises a tubular member, a braided cord (or similar flexible structure), cylindrical hydrophones, pins, two plugs and two couplings. The hose (made of a thermoplastic material) is corrugated or convoluted, and is cuffed at both ends to permit a plug to engage at each end. Each coupling includes a wire rope (or similar flexible structure). Each hydrophone has a longitudinal through-aperture (through which the braided cord passes) and a perpendicularly transverse through-aperture (through which a pin passes while also passing through a void created between strands of the braided cord). The stave is suitable for incorporation into a hydrophone array assembly providing for a selected arrayal of hydrophones, e.g., an assembly including two opposite frames united therebetween by numerous congruous parallel staves, each stave including equally spaced hydrophones, each coupling linking a plug with a frame so that the staves are selectively arranged.

20 Claims, 9 Drawing Sheets

NON-KINKING OIL-FILLED ACOUSTIC SENSOR STAVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to hydrophones, more particularly to methods and apparatuses for arraying plural hydrophones for acoustical purposes.

Hydrophone staves (synonymously referred to herein as acoustic sensor staves) are an integral part of an HGA (high gain array) system that is used for acquiring submarine-radiated noise measurements at sea. Hydrophone staves were developed by the NSWCCD (Naval Surface Warfare Center, Carderock Division) Signatures Directorate, and were initially deployed on the NSWCCD's HGAs. This "potted" stave design, currently in use by NSWCCD, incorporates twenty individual cylindrically shaped acoustic sensors and twenty U-shaped preamp (preamplifier) board assemblies. Each acoustic sensor and preamp unit is separately encapsulated (i.e., potted) in polyurethane. These units are assembled onto a cable conductor bundle with a central Kevlar strength member, and are spaced at equal distances from each other along the cable bundle axis. The conductors and strength member are passed through the center of the acoustic sensor, and the preamp assembly is attached adjacent to each acoustic sensor by placing the cable bundle through the open portion of the U-shaped preamp. The conductors associated with each acoustic sensor are then cut, and jumper wires are soldered, to make the necessary connections between preamp, acoustic sensor and cable bundle. Each hydrophone assembly, which includes a sensor and a preamp, is secured to the cable bundle by encapsulating the unit in a polyurethane material.

The potted hydrophone staves described in the preceding paragraph were first built and deployed in 1993. Since that time, these staves have experienced numerous failures, mostly involving water intrusion through the outer jackets of damaged conductors. Due to the design of the potted hydrophone staves, repair of malfunctioning hydrophones proved to be very difficult, and in many cases impossible. Among the inherent design limitations of these staves are the following: the polyurethane encapsulant is subject to deterioration from sunlight and saltwater; the small sizes of the conductors are associated with exposure to kinking/breaking during deployment/retrieval/storage cycles; the outer jacket of the conductors is the only barrier from water penetration; a damaged hydrophone cannot be efficiently repaired or replaced, and therefore an entire stave of twenty hydrophones must be replaced in order to have a one hundred percent operational stave.

Since NSWCCD's initial deployment of the potted hydrophone staves, many design improvements have been incorporated into the building of some newer potted hydrophone staves that replaced some older ones; nevertheless, hydrophone failures due to water intrusion have continued to cause long-term reliability problems. As a consequence of the above-noted problems associated with the conventional potted hydrophone staves, an engineering endeavor was initiated in October 1997 to develop a more robust stave design that would greatly improve reliability and could be easily repaired if necessary. The present invention's non-kinking, "oil-filled" acoustic sensor stave is a result of this design initiative.

Generally speaking, oil-filled hydrophone staves are devices that are known and used in the acoustic community. Typically, these staves each include an array of phones that are mounted at fixed ends. An oil-filled hydrophone stave is made to contain a liquid material (e.g., Isopar or castor oil) mainly for the purpose of matching the acoustic impedance of the ambient seawater. The U.S. Navy as well as petroleum/oil exploration companies frequently use oil-filled hydrophone arrays in towed array applications. Nevertheless, like the known potted hydrophone arrays and staves, the known oil-filled hydrophone arrays and staves are not as robust as desired in certain handling and storage operations (e.g., are subject to stave kinking) and are characterized by a degree of difficulty in terms of assembly and repair. What is needed is a hydrophone stave that represents an improvement in these problem areas while still meeting the high performance acoustic requirements of the hydrophone stave in an ocean environment.

The following references, incorporated herein by reference, are examples of United States patents that are pertinent to hydrophones, hydrophone staves and/or hydrophone arrays: Skinner U.S. Pat. No. 6,208,584 B1 issued Mar. 27, 2001; Dvorsky et al. U.S. Pat. No. 5,894,651 issued Apr. 20, 1999; Brenner et al. U.S. Pat. No. 5,499,219 issued Mar. 12, 1996; Flanagan et al. U.S. Pat. No. 5,220,538 issued Jun. 15, 1993; Jackett et al. U.S. Pat. No. 4,862,428 issued Aug. 29, 1989; Anderson U.S. Pat. No. 4,745,584 issued May 17, 1988; Rogers et al. U.S. Pat. No. 3,982,144 issued Sep. 21, 1976.

SUMMARY OF THE INVENTION

In view of the foregoing, it is an object of the present invention to provide a better hydrophone stave than that which is currently used by the U.S. Navy.

The U.S. Navy currently uses potted hydrophone staves in full-scale, underwater signature measurements. Required by the U.S. Navy is a reliable and repairable hydrophone stave that can replace the existing potted hydrophone staves. In particular, a hydrophone stave should be: (i) robust in handling operations; (ii) robust in storage operations; (iii) not vulnerable to stave kinking; (iv) easy to assemble; (v) easy to repair. The present invention's novel oil-filled hydrophone stave meets these criteria.

In accordance with typical embodiments of the present invention, an apparatus comprises an elongate structure that includes a hose, a pair of headers and a pair of joints. The hose has a main section and two cuffed end sections. The main section is convoluted or corrugated. Each header plugs a smooth cuffed end section. Each joint is attached to a header. According to frequent inventive practice, the structure further includes an elongate strength member inside the hose. The strength member connects a pair of headers. The strength member is at least substantially characterized by a braided configuration so as to be adaptable to the disposition therethrough of plural fasteners each being for fastening an object with respect to the strength member. The apparatus is thereby adaptable to association with a plurality of objects so as to permit the alignment of the objects inside the structure.

Some preferred inventive applications involve acoustics, wherein the objects are acoustic devices, and wherein the structure is adaptable to containment of an acoustically suitable fluid so that the acoustically suitable fluid is sealed inside the structure and so that ambient fluid is sealed outside the structure. In many acoustical applications, the inventive apparatus comprises a plurality of the structures, and the apparatus further comprises a pair of frames, wherein the structures are interposed between the frames. The apparatus is adaptable to association with the objects so as to permit the arrayal of the objects inside the structures. The main section of the hose has a non-kinking quality, and each joint has a flexible quality. The inventive apparatus has a pliable quality associated with the non-kinking quality of the hose and the flexible quality of the joints—a pliable quality that can facilitate storage of the inventive apparatus.

The present invention has several unique features and associated advantages, among which are those noted in this paragraph. Firstly, the folded (e.g., corrugated or convoluted) hose wall allows the inventive stave to be collapsed such that hose kinking is prevented. Kinking is undesirable since it can overstress the hose and internal wiring and thereby lead to component failure. Secondly, the use of a solid locking pin in the open braid of the strength member allows each hydrophone (potted hydrophone/preamp assembly) to be positioned along the strength member easily and without reducing the strength of the strength member. Thirdly, in addition to the use of solid pins with respect to the hydrophone/preamp assemblies, the use of mating sockets for harnessing the internal wiring connection via crimping upon the wires provides for easy fabrication as well as avoidance of the potential danger, characteristic of pins that are soldered, of overheating of the pins so as to cause the pins to de-solder from the preamp board. Fourthly, the ribbon fairings sewn on an open-mesh booted sleeve represent easily applied "strum reduction devices." At the same time, the open-mesh fairing sleeve not only permits visualization through the mesh openings for verification of hydrophone spacing, but also minimizes any entrapped air between the outer hose wall and the fairing sleeve. Fifthly, the flexible joint at either end of the hydrophone stave provides for capability to flex via highly acute angles and thereby supports the collapsed storage configuration required for the current HGA system used by NSWCCD.

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 8 is a diametrically cross-sectional plan view of an inventive hydrophone stave such as that shown in FIG. 3 or FIG. 4, wherein FIG. 8 illustrates a circumferentially and sequentially staggered one-hundred twenty degree relationship among the ribbon fairings that are attached to the exterior mesh.

DETAILED DESCRIPTION OF THE INVENTION

Figure 1:
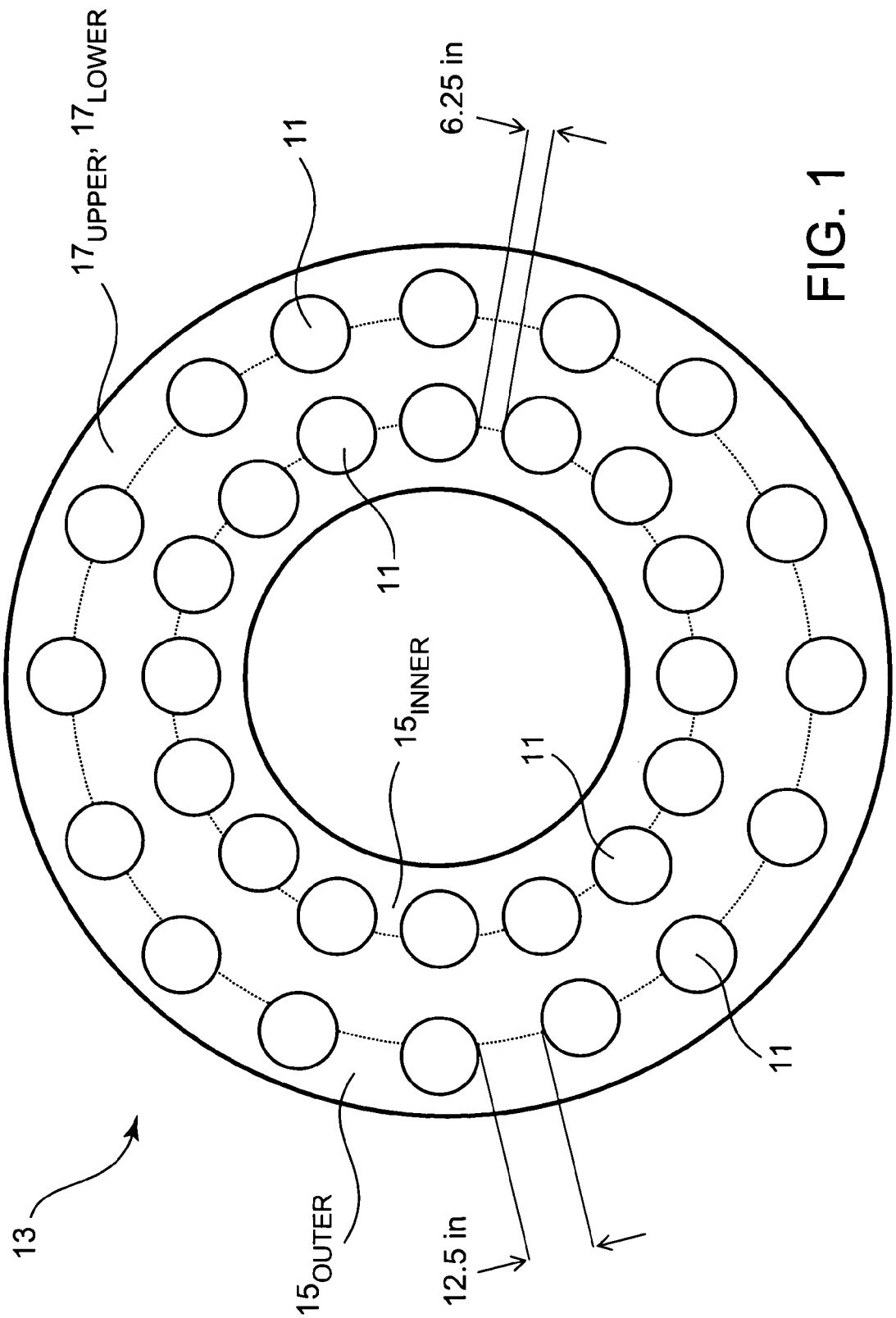
FIG. 1 is a diametrically cross-sectional plan view of a cylindrical-type high gain array assembly including hydrophone staves in accordance with the present invention.
Figure 2:
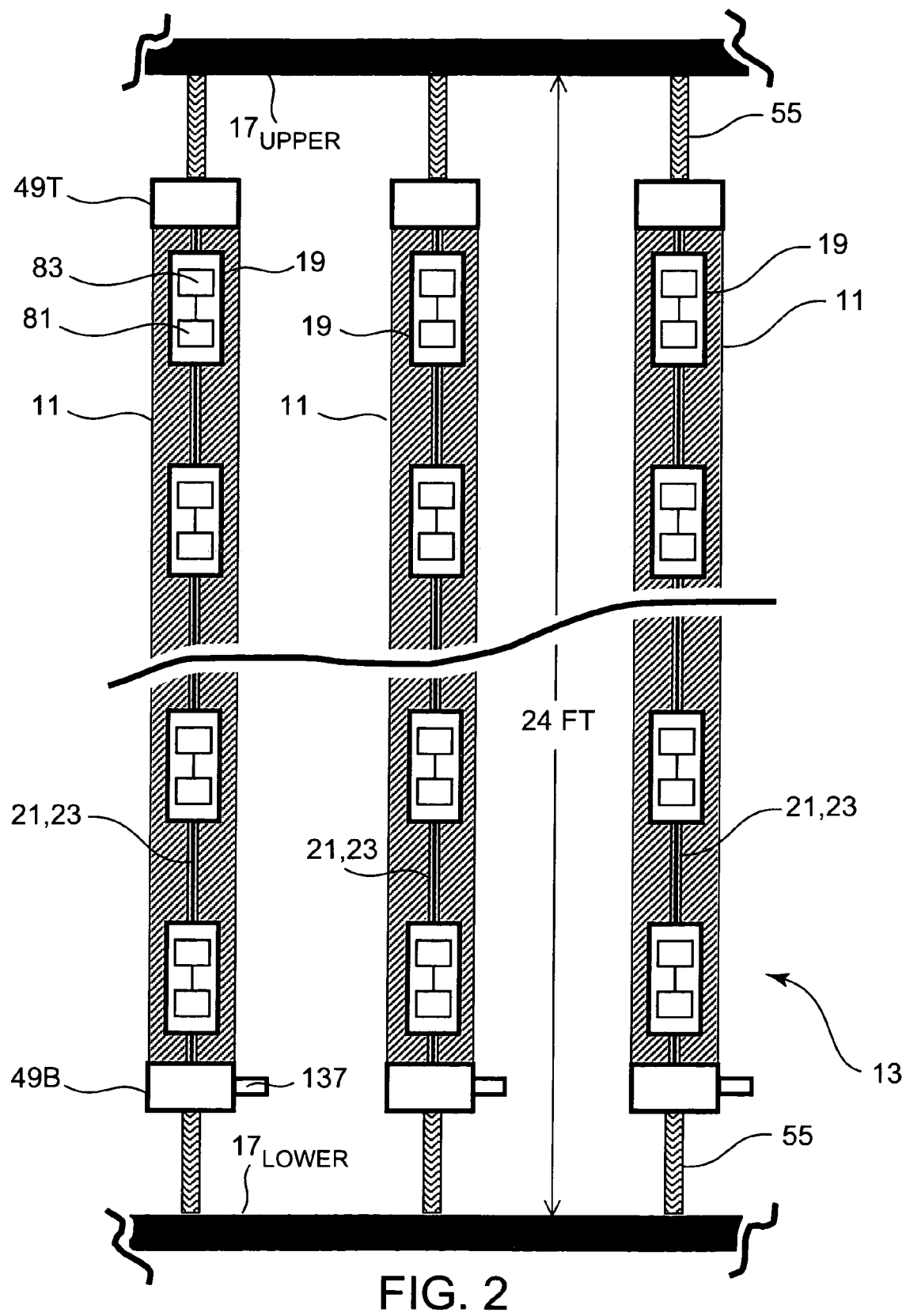
FIG. 2 is a partial longitudinally cross-sectional elevation view of the high gain array assembly shown in FIG. 1.

Ongoing tests performed by NSWCCD using one or more inventive hydrophone stave 11 prototypes arranged or placed according to certain U.S. Navy standards continue to yield positive results and demonstrate the efficacy of the present invention. Referring now to FIG. 1 and FIG. 2, inventive hydrophone staves 11 can be made part of an HGA configuration 13 similar to that which is currently utilized by NSWCCD. The HGA 13 configuration that is currently deployed from the U.S. Navy's laboratory test ship USNS HAYES for NSWCCD use is shown in FIG. 1 and FIG. 2. Although the present invention remains in the testing stages, it is contemplated that thirty-two inventive hydrophone staves may one day be used in the HGA arrangement that is diagrammatically illustrated in FIG. 1 and FIG. 2. It is to be understood that the present invention admits of practice in a variety of high gain array contexts, and that conceptual embodiments such as shown in FIG. 1 and FIG. 2 merely represent examples of inventive practice. For instance, although the hydrophone staves are shown in FIG. 1 to be circularly arranged, according to inventive practice the hydrophone staves can be arranged in practically any desired special configuration in order to obtain acoustic gain as designed via beamforming of the signals from the hydrophone staves.

HGA 13 includes two nested hollow cylindrical forms $15_{INNER}$ and $15_{OUTER}$. Each of the cylindrical forms $15_{INNER}$ (the "aperture 2 ring") and $15_{OUTER}$ (the "aperture 1 ring") is defined by sixteen parallel and equally spaced hydrophone staves, each of which is included in a vertical stave 11 extending between an upper (top) cylindrical space frame $17_{UPPER}$ and a lower (bottom) cylindrical space frame $17_{LOWER}$. Each hydrophone stave 11 includes twenty co-linear and equally spaced hydrophones 19. HGA 13 is shown in FIG. 1 and FIG. 2 to be in it's natural, unbent condition, wherein vertical staves 11 are straight and are parallel to each other.

In the outer cylindrical form $15_{OUTER}$, the inter-stave spacing between adjacent hydrophones 19 is 12.50 inches; in the inner cylindrical form $15_{INNER}$, the inter-stave spacing between adjacent hydrophones 19 is 6.25 inches. Spacing of hydrophones 19, both in a vertical (i.e., intra-stave) and horizontal (i.e., inter-stave) direction, must be maintained to within precise distances in order to properly use the hydrophone 19 outputs in a beam-former and obtain the necessary gain and spot beam characteristics.

Each inventive stave 11 is approximately twenty-four feet in length. Each hydrophone 19 has a diameter of approximately 1.25 inches. According to generally preferred inventive practice, the inner circumference of hose 25 (shown in FIG. 3 through FIG. 7 and FIG. 10) is only slightly greater than that of hydrophones 19. Every inventive stave 11 must be capable of being collapsed into a compact space such that the HGA modules can be stored properly aboard ship. The operational use of the staves 11 requires that they be expanded and collapsed for each trial deployment and operate continually at predetermined ocean depth for the duration of the trial. In order to properly support trial measurement requirements, stave reliability is critical.

Still with reference to FIG. 1 and FIG. 2, and particularly with reference to FIG. 3 through FIG. 10, inventive hydrophone stave 11 includes plural hydrophones 19, plural electrical conductors (e.g., wires) 21, a braided strength member 23, a hose 25, an exterior jacket assembly 59, plural reticulated foam pieces 31, an interior mesh sleeve 65, a pair of axially extreme header fixtures 49, a pair of axially extreme wire rope termination sections 55 and oil fill fluid 201. Each wire rope termination section 55 represents a flexible line that connects a header 49 with a space frame 17. Exterior drag-reducing fairing jacket 59 includes an exterior mesh sleeve 27 and plural coated fabric ribbons 29 that are sewn to mesh sleeve 27. A foam piece 31 is interposed between every pair of two longitudinally-axially consecutive hydrophones 19, as well as between the axially extreme hydrophones 19 and the corresponding adjacent header fixtures 49. Interior mesh sleeving 65 is situated between the "folded" (corrugated or convoluted) section $25_F$ of hose 25 and parts/components internal thereto; more specifically, interior mesh sleeving 65 is located around the outside of hydrophones 19 and foam pieces 31, and inside of "folded" section $25_F$ of hose 25. Hydrophones 19 are equally spaced apart from each other and are separated by foam pieces 31 that, commensurately, are equally spaced apart from each other.

Figure 11:
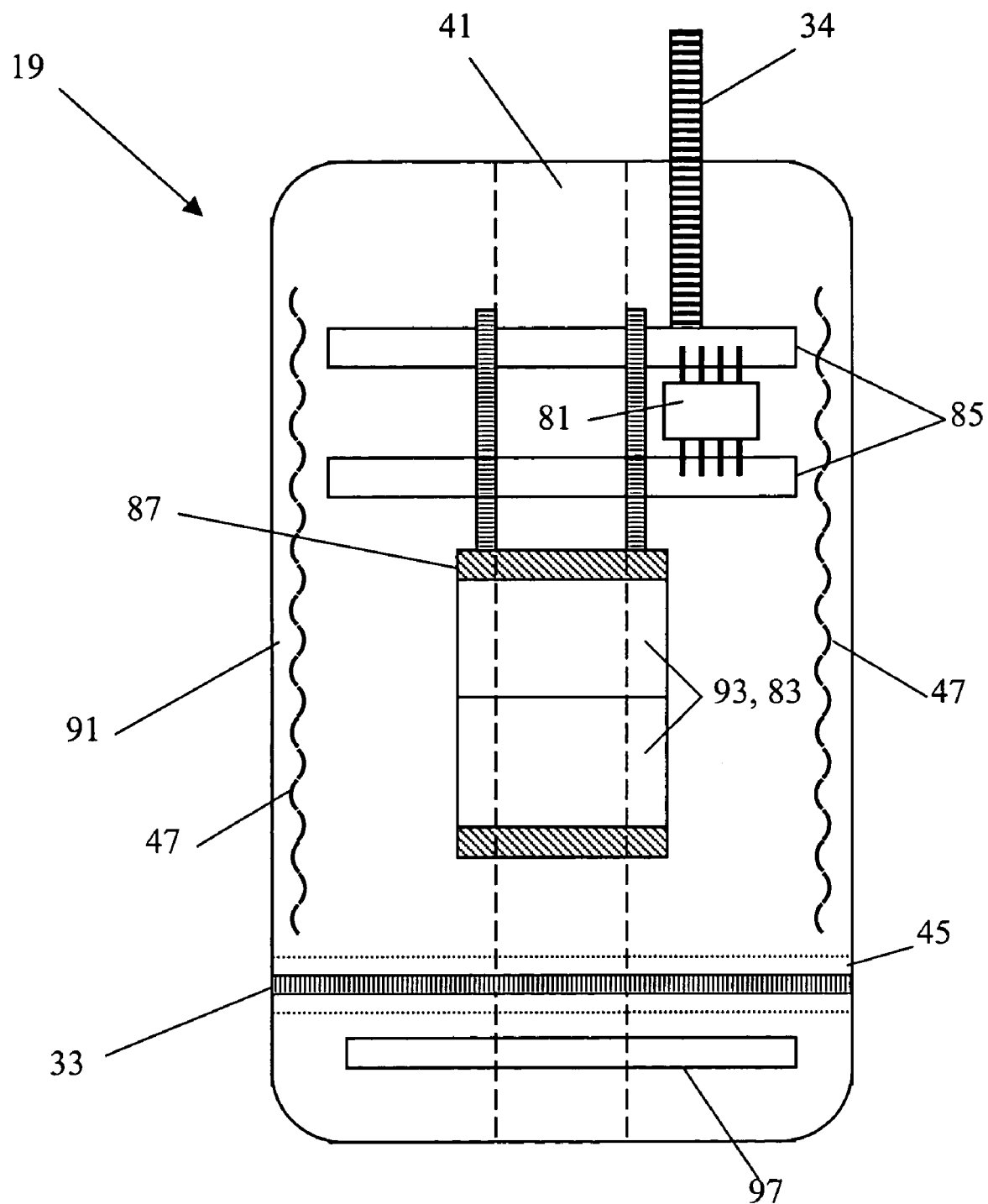
FIG. 11 is an enlarged, more detailed elevation view of a hydrophone such as shown in FIG. 2.

With reference to FIG. 11, each hydrophone 19 is at least substantially cylindrical and is equipped with two electrically connected electronic components, viz., a preamplifier 81 and an acoustic sensor 83. Each hydrophone 19 includes, in integral fashion, an EMI screen 47, polyurethane potting material 91, a preamplifier 81 and an acoustic sensor 83 (including ceramic material 93). A complete hydrophone assembly 19 is divisible into two different contiguous longitudinal axial portions with each component encased in a polyurethane material 91 (monolithic pour for complete assembly), viz., preamp board or boards 85 and acoustic sensor portion 87. The preamplifier component 81 is contained in the hydrophone's preamp board 85 and the acoustic sensor component 83 is contained in the hydrophone's acoustic sensor portion 87. Polyurethane 91 completely surrounds axial portions 85, 81 and 87, 83. Each hydrophone 19 is provided with a diametric through-hole 45, located at an axial end of hydrophone 19 through the polyurethane 91 and adjacent to preamp board 85. In each hydrophone 19, the diametric through-hole 45 allows for situation therethrough of a hydrophone securement or mounting pin 33. For purposes of affording electromagnetic shielding, an EMI (electromagnetic emission) screen 47 is also embedded in the monolithic pour, just beneath the surface and around the circumferential peripheral portion of hydrophone assembly 19.

Figure 3:
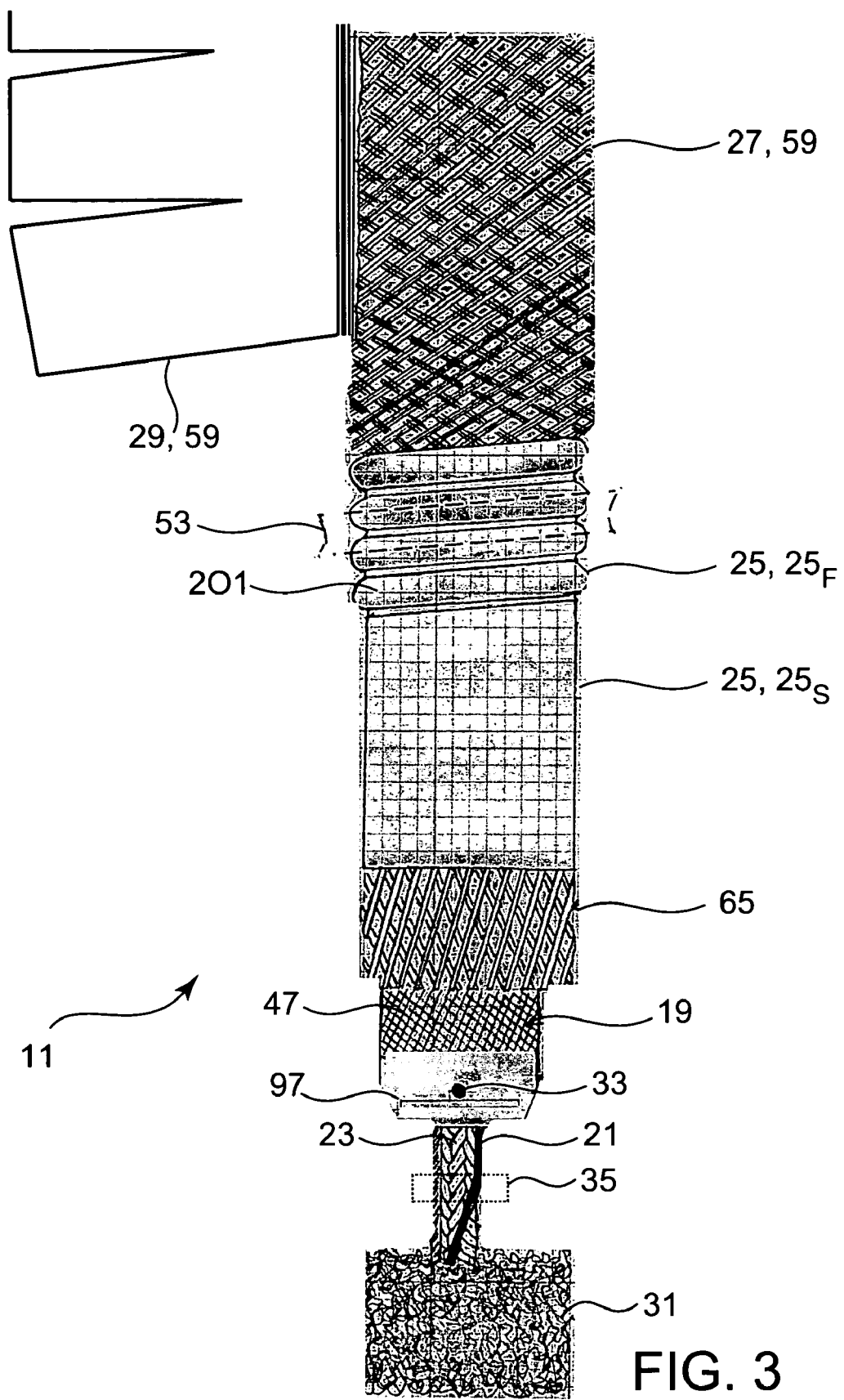
FIG. 3 is a truncated longitudinal elevation view of a hydrophone stave in accordance with the present invention, wherein various interior and exterior parts and components of the inventive hydrophone stave are revealed along its length, and wherein the inventive hydrophone stave's hose component is "convoluted."

According to typical inventive fabrication of a hydrophone 19, acoustically sensitive cylindrical piezoelectric ceramic 93 of acoustic sensor 83 is bonded to an aluminum tube and end caps so that the ceramic ends are sealed and air-backed. The ceramic 93, along with a low noise preamplifier 81 and an EMI screen 47, is encapsulated in polyurethane 91 to create a complete hydrophone 19 assembly. In the encapsulation (molding) procedure, the EMI screen 47 is wrapped around the ceramic material 93, and the combination is molded into an integral hydrophone 19 unit using polyurethane 91. According to some inventive embodiments, a flat washer 97 such as that shown in FIG. 3 is also integrated in the molding process.

In each hydrophone 19, the plastic washer 97 insert is located adjacent to the pin 33. Washer 97 distributes any localized stress applied by pin 33 on the surrounding polyurethane 91. This insert insures that the hydrophone 19 unit can be easily removed from stave 11 without the tearing of pin 33 through the polyurethane 91 material, which may soften after many years of exposure to the oil fill fluid 201. Based on acoustic performance, castor oil was selected for the fill fluid 201. Numerous polyurethane materials were evaluated via accelerated life testing exposure to the castor oil 201; based on this experimentation, Adiprene was selected as being the best candidate for the polyurethane 91 material in order to meet an estimated 10-year life reliability.

Figure 4:
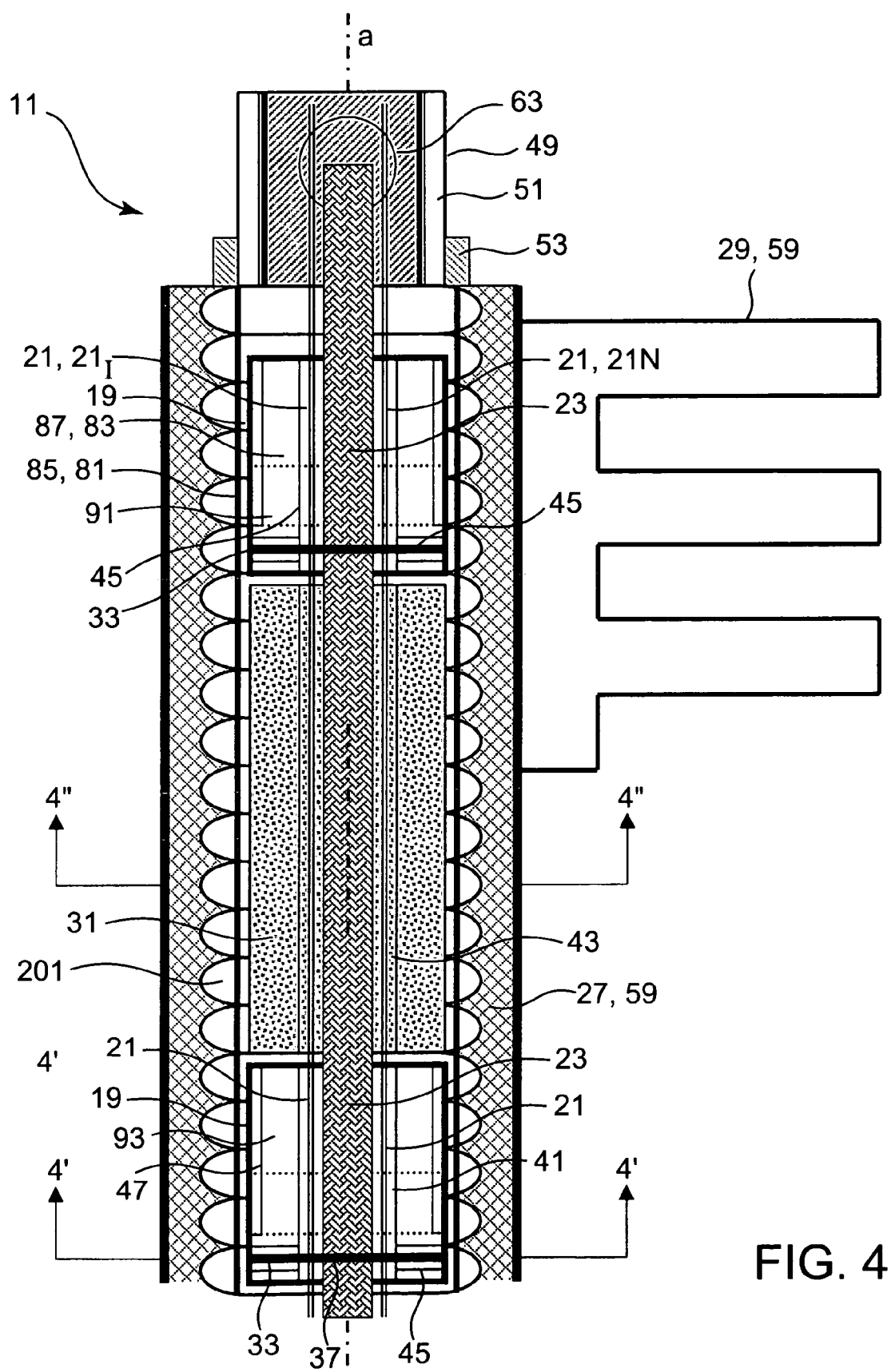
FIG. 4 is a partial longitudinally cross-sectional elevation view of an inventive hydrophone that is akin to that shown in FIG. 3, a notable difference being that the inventive hydrophone stave's hose component shown in FIG. 4 is "corrugated" as distinguished from "convoluted."

Each stave 11 includes a hose 25, which is a tube that is made of a material that is acoustically transparent and is visibly transparent or translucent to permit observation of the interior of stave 11, in particular of hydrophones 19. According to typical inventive practice, hose 25 is made of a polyurethane. In this regard, unique to the present invention is its use a fluroplastic or fluropolymer material for hose 25; that is, according to many preferred inventive embodiments, hose 25 is made of a fluroplastic or fluropolymer hose material (e.g., Polytetraflouethylene), such as Teflon, that lends itself to being shaped during fabrication so as to have two extreme smooth cuff sections $25_S$. Hose 25 generally describes a cylindrical shape that is characterized by geometric longitudinal axis a, which is generally defined by braided strength member 23. Similarly, hydrophones 19, foam pieces 31 and mesh sleeve 27 each generally describe a cylindrical shape that is characterized by the same longitudinal axis a, as shown in FIG. 4. Hydrophones 19 are each provided with a longitudinal axial through-hole, bore 41, and foam pieces 31 are each provided with a longitudinal axial through-hole, bore 43. Axial bores 41 and 43 permit disposition therethrough of strength member 23 and electrical conductors 21 so as to general coincide with geometric longitudinal axis a and extend at least the entire length of stave 11.

Figure 5:
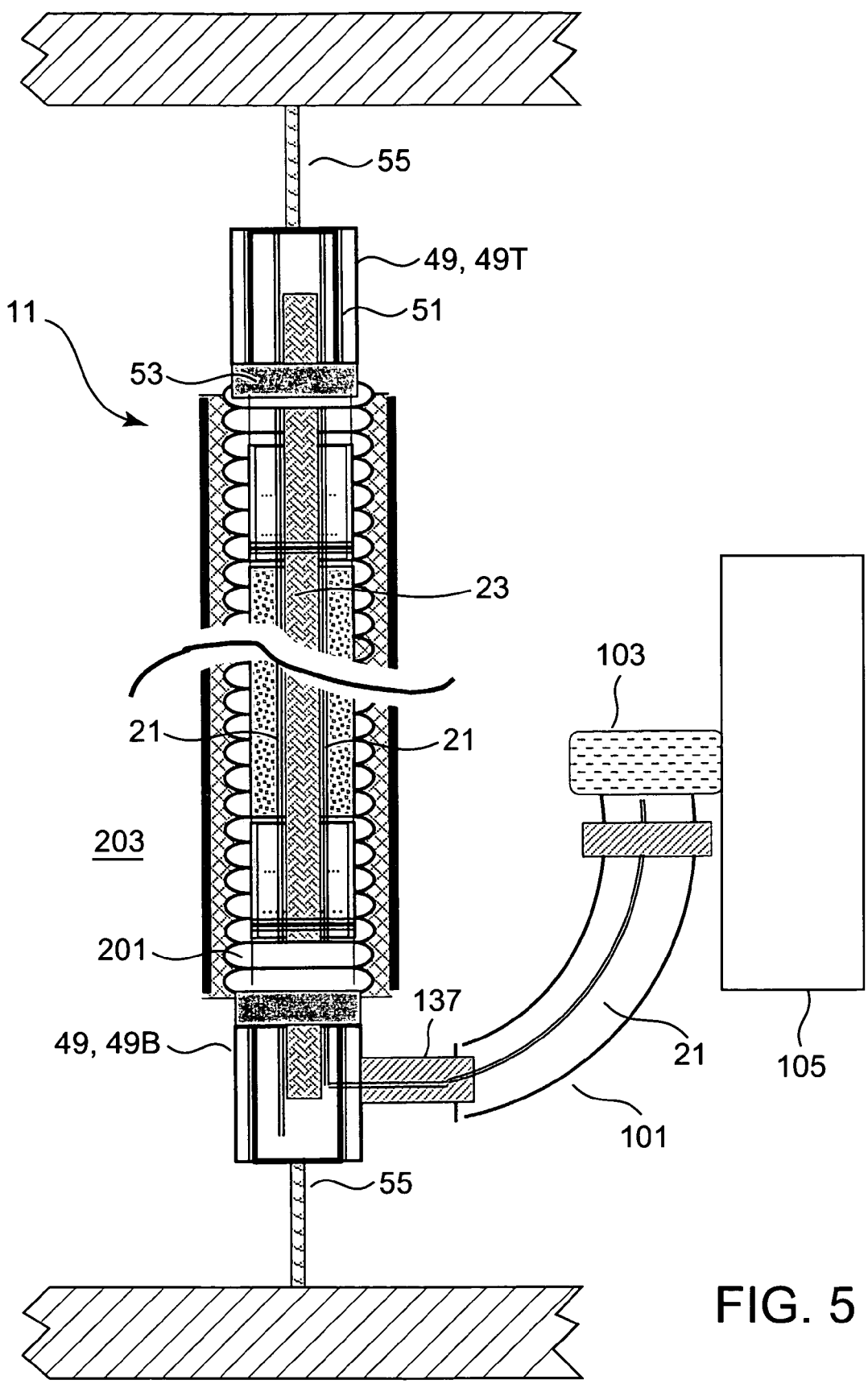
FIG. 5 is a truncated view, similar to the view shown in FIG. 4, of the inventive hydrophone stave shown in FIG. 4, wherein FIG. 5 schematically depicts the two opposite longitudinal extremities of the inventive hydrophone stave and its association at one extremity with telemetry and power via an oil-filled "pigtail" hose.
Figure 6:
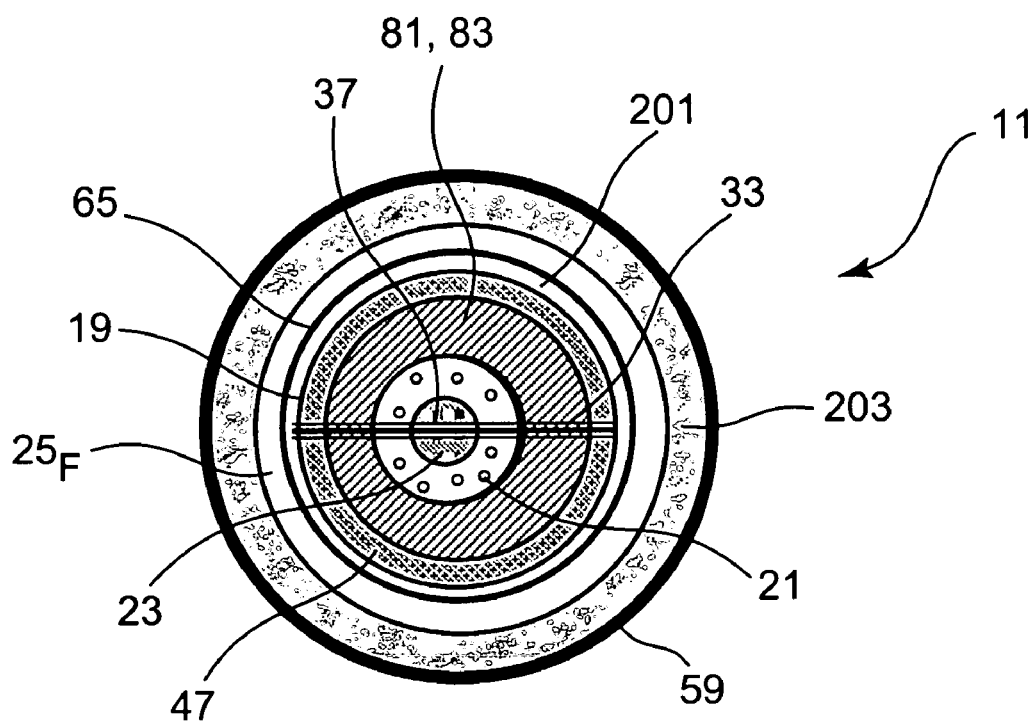
FIG. 6 is a diametrically cross-sectional plan view, taken along section 4'—4' of FIG. 4, of the inventive hydrophone stave shown in FIG. 4.
Figure 7:
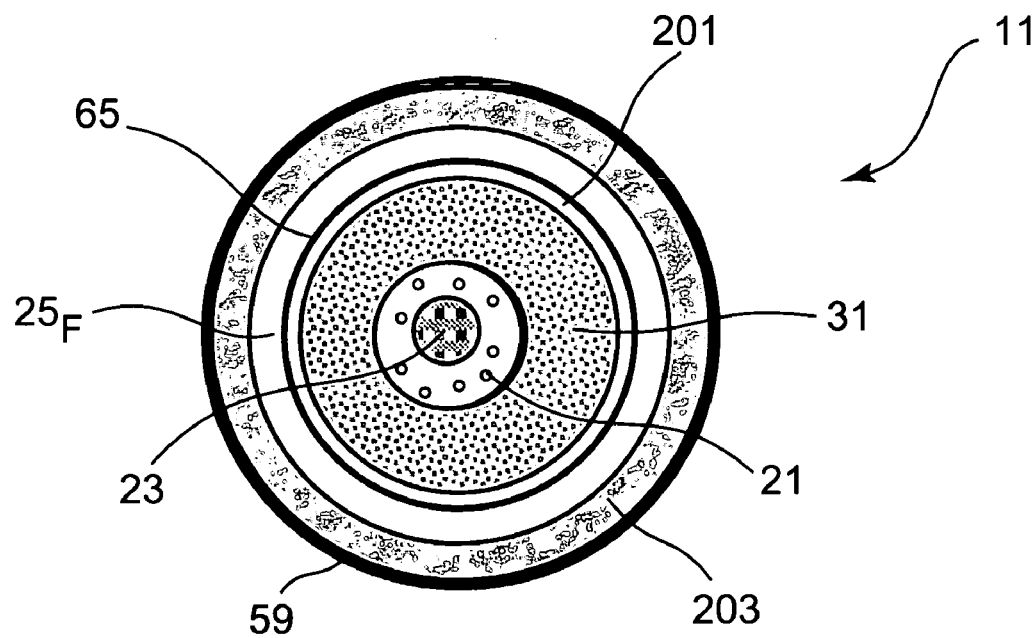
FIG. 7 is a diametrically cross-sectional plan view, taken along section 4"—4" of FIG. 4, of the inventive hydrophone stave shown in FIG. 4.
Figure 9:
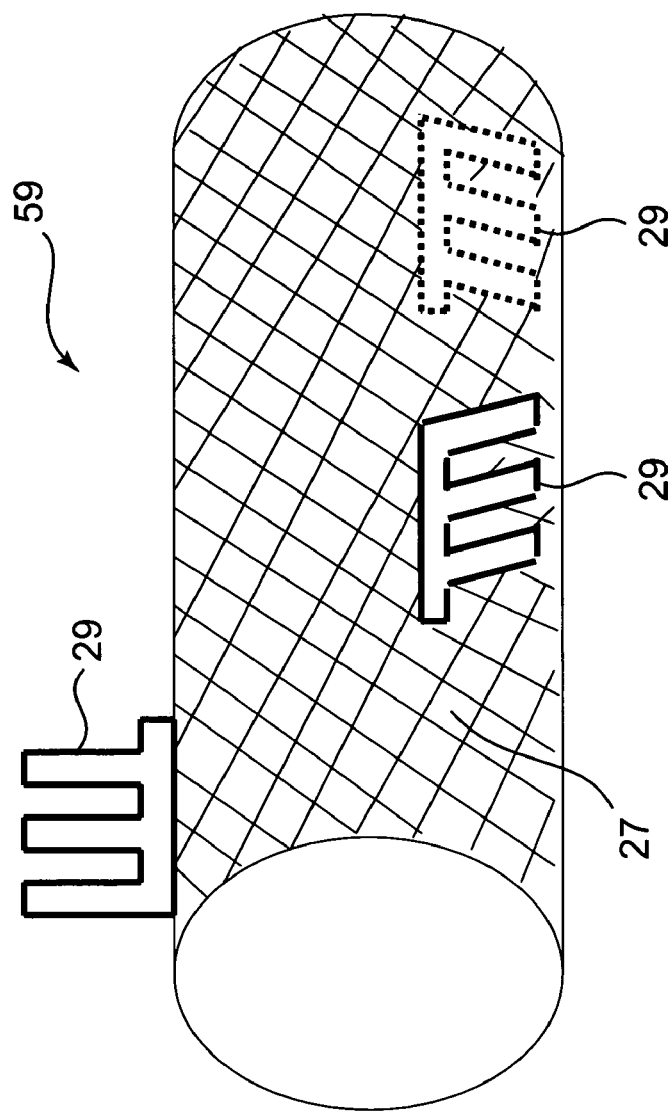
FIG. 9 is a perspective view of the inventive hydrophone stave shown in FIG. 8, also illustrating the 120° circumferential staggering, in longitudinal sequence, of the ribbon fairings.
Figure 8:
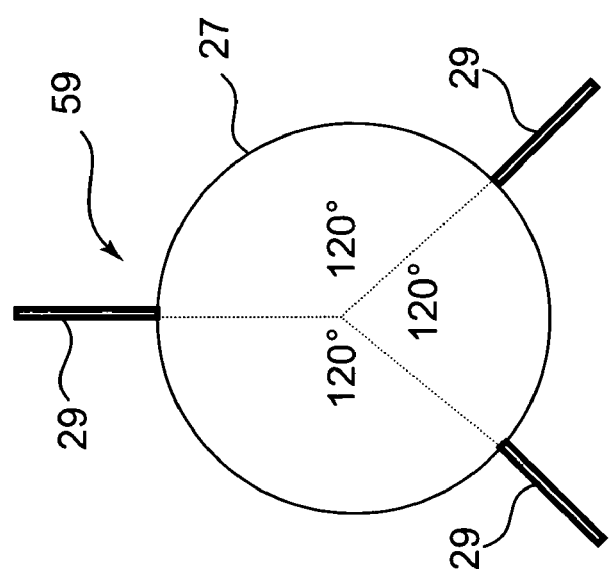
Figure 10:
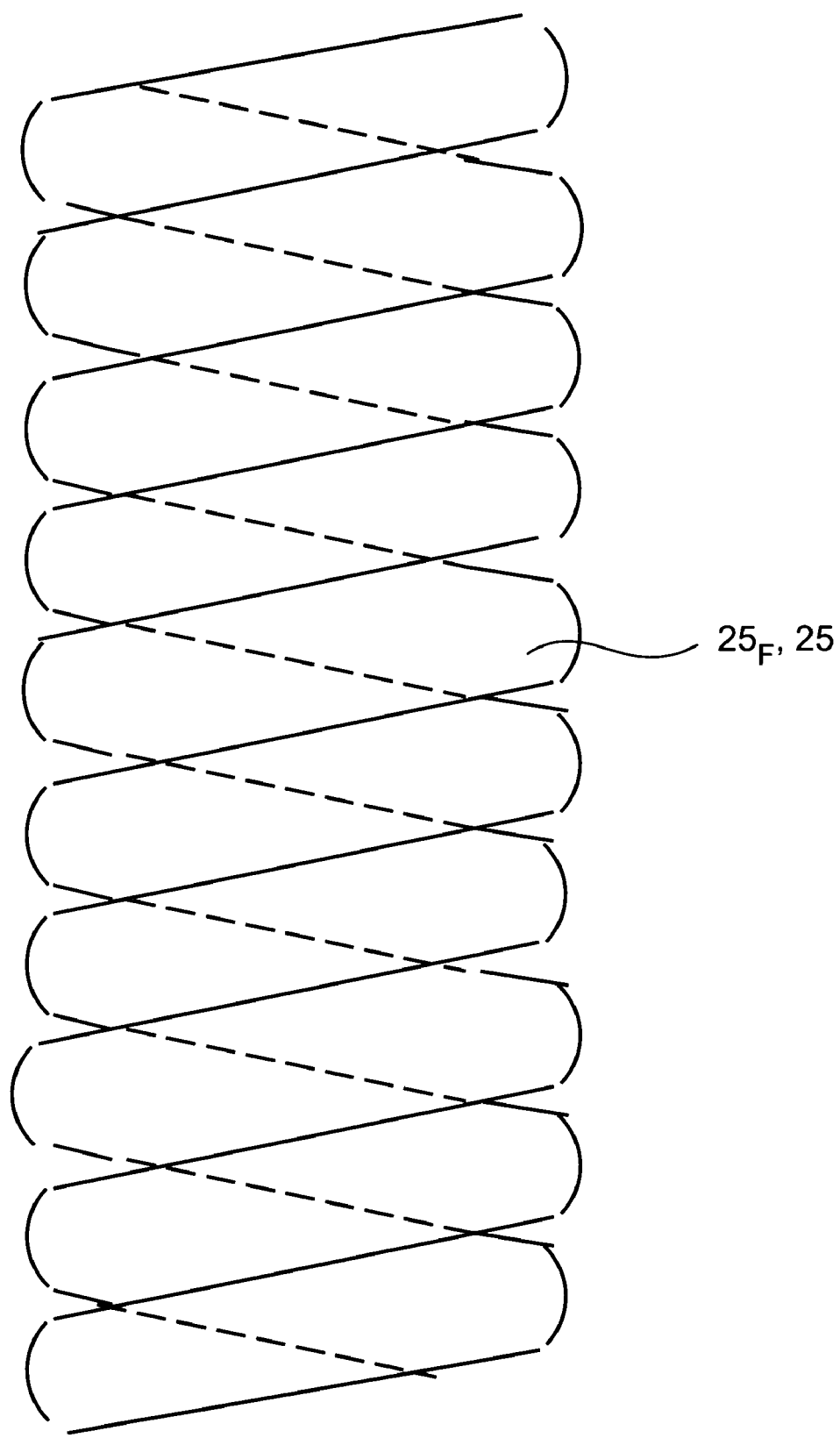
FIG. 10 is a longitudinal elevation view of an inventive hydrophone stave's hose component that (like the hose component illustrated in FIG. 3) is "convoluted," as distinguished from the "corrugated" hose component illustrated in FIG. 4 and FIG. 5.

Hose 25 primarily includes a "folded" section $25_F$, and secondarily includes, at the ends, two relatively short smooth cuff sections $25_S$. Folded hose section $25_F$, which is intermediate the two smooth cuff sections $25_S$, is characterized by generally circumferential folds. That is, folded hose section $25_F$ is "convoluted" or "corrugated" to promote its "anti-kinking" character—e.g., in terms of axial compressibility, bending capability, collapsibility and other material and structural properties pertaining to flexibility—for facilitating placement and storage of stave 11. A "convoluted" hose section $25_F$, such as shown in FIG. 3 and FIG. 10, is configured in folds generally describing curved or tortuous windings or coils. A "corrugated" hose section $25_F$, such as shown in FIG. 4 and FIG. 5, is configured in folds generally describing parallel and alternating ridges and grooves.

Strength member 23 is a cable, rope or other line made of a fiber material such as Kevlar or other strong fibrous material. Strength member 23 has a "braided" configuration—i.e., one which is characterized by interweaving, or interlacing of plural (typically, at least three) strands or strand-like elements. The braided configuration of strength member 23 permits separation of some fibers therein so as to allow individual pins 33 to pass therebetween and completely through strength member 23. Each pin 33 is situated through a diametric bore 45 of the corresponding hydrophone 19 so as to be compression fit through the hydrophone 19 and pass through the braided strength member 23. Braided strength member 23 passes through stave 11 approximately in the longitudinal axial direction a. Electrical conductors (e.g., copper wires) 21, which also pass through stave 11 in generally the same longitudinal axial direction a, are closely associated with braided strength member 23. The electrical conductors 21 are of two kinds, viz., insulated "coax" wires $21_I$ (which circuit within stave 11) and insulated single conductor wires $21_N$ (which connect outside of stave 11 with telemetry 105, such as shown in FIG. 5). At periodic locations along longitudinal axis a, ring clamps 35 (e.g., tie wraps or velcro straps) such as shown in FIG. 3 are circumferentially disposed around the combination of strength member 23 and conductors 21, thereby holding them together as a bundle.

The inventive stave 11 shown in FIG. 3 resembles the inventive prototype that has been tested with good results by NSWCCD. To eliminate hose kinking, hose 25 is designed as having a Teflon construction and a convoluted main section $25_F$. As shown in FIG. 4 and FIG. 5, hose 25 is sealed at both axial ends, one at each end, by two different mechanical header fixtures 49, viz., top header fixture 49T and bottom header fixture 49B. At each end of hose 25, a header fixture 49 is fitted inside the corresponding smooth end section $25_S$, such smooth end section $25_S$ thereby being sealed by the header fixture 49. Each header fixture 49 serves not only to plug the oil inside of hose 25, but also represents a mechanical termination for strength member 23, which transfers the mechanical load to the header fixtures 49 and also serves as a mounting fixture for the wire rope termination 55. The top header 49T contains a fluid fill valve. The bottom header fixture 49B is apertured (such as via a hollow protuberance 137 shown in FIG. 5) for allowing electrical conductors 21 to feed therethrough and extend through a pigtail 101 so as to reach, via an underwater connector (e.g., a min M connector containing a fluid fill plug) 103, a pressure vessel 105. Pressure vessel 105 collects data transmitted via electrical conductors 21 from each hydrophone 19 contained in each stave 11, and in turn provides power to each hydrophone preamplifier 81.

The end sections $25_S$ of hose 25 are "cuffed" in order to permit engagement with header fixture 49, thereby ensuring a tight seal and preventing oil 201 from leaking out of, and/or seawater 203 from leaking into, hose 25. A polyester (e.g., polyethylene) interior mesh sleeving 65 fits inside each end section $25_S$ of hose 25. With regard to cuffed end sections $25_S$, the fabrication process involves heating the ends of a completely corrugated or convoluted hose 25 until the material memory is lost, so that the hose end sections $25_S$ each return to a small cylindrical shape without the corrugations or convolutions. A polyurethane ring or sealing sleeve 51 is molded onto the outer circumference of the mechanical headers 49. The cuffed end sections $25_S$ of hose 25 are slipped onto the respective inside ends of header 49 (one header 49 associated with each end section $25_S$), and an external clamp 53 is placed over each cuffed hose end section $25_S$, thereby locking it onto the polyurethane ring 51 and forming an impermeable seal.

In addition to the corrugation or convolution of hose 25, another inventive feature that serves to prevent kinks is a wire rope termination section 55 that is attached to a header fixture 49 at either or each of both ends of stave 11. When the HGA 13 is stored in the collapsed configuration, a bottom end portion of stave 11 is forced into a sharp bend of approximately one hundred eighty degrees. A similar situation occurs for the top portions of staves 11 of the inner ring $15_{INNER}$ of HGA 13, since these inner ring staves 11 must make a sharp bend and emerge from the inner ring $15_{INNER}$ of the HGA 13 to the outside portion of the top cylindrical space frame $17_{UPPER}$. To eliminate this high stress region for the hose 25 wall, a flexible wire rope termination section 55 is utilized as part of an overall end termination.

The present invention's oil-filled hydrophone stave assembly is loosely analogous to the conventional potted hydrophone design insofar as being cylindrical in shape and accordingly allowing both the strength member 23 and the cable conductors 21 to pass approximately along the axial center; this kind of centric arrangement ensures the absence of acoustic interference which would ensue from the positioning of wire(s) 21 or strength member(s) 23 in front of the acoustic sensor material of hydrophones 19. However, as distinguished from known hydrophone methodologies, a typical embodiment of the present invention's oil-filled hydrophone stave 11 implements hydrophones 19 each of which is uniquely designed to be a self-contained unit that is molded under a vacuum to ensure that all air bubbles are removed from the polyurethane 91 encapsulant.

As shown in FIG. 4, each molded hydrophone assembly 19 has male electrical contact pins 34 associated with preamplifier boards 85. Each electrical contact pin 34 extrudes from a corresponding preamplifier board 85, through and above the polyurethane 91 casting. Electrical connection to the hydrophones 19 is accomplished by means of pressing on female receptacles that are crimped onto the cable conductors 21. The hydrophone 19 has a through-hole 45 oriented perpendicular to the hydrophone 19 axis (which is approximately coincident with longitudinal axis a of hose 25). Through-hole 45 allows for a fastener such as a metal or plastic pin 33 to be inserted through the hydrophone 19 (in particular, through the polyurethane 91 of hydrophone 19) and through a strand-separation opening 37 in the braided weave of the fiber strength member 23, thereby locking the hydrophone 19 into position along the axial strength member 23 without applying any localized stress on the strength member 23, and thereby fully ensuring that break strength can be achieved. Strand-separation opening 37 is typically created perpendicular to the longitudinal axis a of strength member 23. The braided strength member 23 is terminated at each end via an eye splice 63 in association with a header 49, thus ensuring a reliable full break strength capability.

The inventive apparatus is uncomplicatedly and quickly assembled. The present invention thus uniquely features an electromechanical arrangement that facilitates assembly and disassembly of the inventive stave 11, especially by obviating the need for soldering; advantageously, inventive practice eliminates any possibility that the assembler could apply a solder gun or soldering iron too long, thereby overheating the electrical pin 34 being soldered to the base of the preamp board 85 inside of the potting material 91 and destroying the hydrophone 19.

The present invention's oil-filled acoustic sensor stave 11 additionally features an outer jacket unit 59, which includes an open mesh sleeve 27 and plural drag-reducing ribbon fairings 29, and which serves to reduce cable strum when exposed to ocean 203 currents. Mesh sleeve 27 of jacket 59 is slipped over hose 25. Each ribbon fairing 29 is made of a suitable material such as PVC-coated polyester fabric, and is sewn onto an expandable monofilament meshed sleeve 29 made of a suitable material such as polyester. Ribbon fairings 29 are sewn at nominal one foot lengths in the horizontal plane along the stave axis a, wherein ribbon fairings 29 circumferentially alternate every 120 degrees. The inventive design of jacket 59: reduces strum; minimizes, on the outside of stave 11, any air entrapment that can prevent proper acoustic calibration; provides for easy installation and removal on stave 11; allows for visualization of the hydrophone 19 assemblies situated inside of the translucent (e.g., Teflon) hose 25; affords additional scuff protection for the corrugated/convoluted oil-filled hose 25.

Multifarious embodiments are possible in practicing the oil-filled acoustic sensor stave in accordance with the present invention. Diverse configurations and configurational adjustments can be inventively practiced, for instance in terms of stave length (which can be made to be longer or shorter) and hydrophone positioning (which can be made to be closer or further apart). Although NSWCCD used refined castor oil (e.g., DB-grade) in inventive testing, alternative fill fluids 201 (e.g., Isopar L) may be used. Similarly, there are many types of polyurethane potting materials 91 and associated theromoplastic injection techniques that can used to encapsulate the hydrophone 19 assemblies. Hose 25 material other than Teflon can be used, and the hose 25 wall (specifically, in the main section $25_F$) can be of either a convoluted design (such as shown in FIG. 3 and FIG. 10) or corrugated design (such as shown in FIG. 4 and FIG. 5). There are also numerous types of braided or woven strength members 23 that can be utilized, as well as numerous types of linear termination segments 49. Nevertheless, the design selections of fill fluid 201, potting materials 91 and hose 25 wall material must take into account the compatibilities of the different materials for long term reliability as well as for meeting other performance characteristics in terms of acoustic and mechanical properties.

According to typical inventive fabrication of a hydrophone stave 11, both ends of braided strength member 23 (e.g., Kevlar) are spliced into eye loops 63, then attached and stretched between two stainless steel headers 49 and wire rope terminations 55 to a fixed distance. Hydrophones 19 are affixed to the strength member 23 with fastener pins 33 situated between some braids of strength member 23. Coax wires $21_I$ and single conductor Teflon-jacketed wires $21_N$ are soldered to a connector insert. The insert is assembled into an underwater connector 103 (same design as hollow protuberance 137). A flexible pigtail hose 101 (e.g., polyurethane), to be subsequently filled with fluid 201, is slid over the wires 21 and the connector stem 103. The wire 21 bundle is fed through the bottom header 49 stem and the cuffed sections $25_S$ of the corrugated Teflon hose 25. Cuffed sections $25_S$ are each fitted over a header 49 stem at one of both ends of hose 25. The hose 25 on both ends are band-clamped (using ring clamps 53) in position over the connector and header 49 stems for a watertight seal with polyurethane ring or sealing sleeve 51. The wires 21 are then routed through the central axis a of the hydrophone assembly. The wires 21 are cut to length and terminated with a crimp female receptacle. The wires are attached to the hydrophone's preamplifier board 85 pins as required for power input, electrical calibration input and electrical signal output via the crimped wire receptacles. Reticulated polyurethane foam is cut into foam pieces 31 and fitted between the hydrophones 19 and between the extreme hydrophones 19 and headers 49. A polyethylene mesh sleeve 65 is slid over the hydrophones 19 and foam pieces 31. A Teflon convoluted hose 25 is then cut to length, and a smooth cuff $25_S$ is made on the hose 25 ends in order to seal the hose 25 to the top and bottom headers 49. The Teflon hose 25 is slid over the polyethylene interior mesh sleeving 65. The special drag-reducing ribboned fairing jacket 59 is installed over the Teflon hose 25 and banded with the hose 25 over the header 49 polyurethane seals. The fairing jacket 59 includes a circumferentially staggered series of PVC-coated polyester fabric ribbons 29 that are each sewn to a polyester mesh sleeving 27. The sealed stave 11 assembly is filled with castor (or other) oil 201.

Other embodiments of the present invention will be apparent to those skilled in the art from a consideration of this specification or practice of the invention disclosed herein. Various omissions, modifications and changes to the principles described herein may be made by one skilled in the art without departing from the true scope and spirit of the invention, which is indicated by the following claims.

What is claimed is:

1. Acoustic apparatus suitable for underwater use, said acoustic apparatus comprising:
    a tube generally characterized by a geometric longitudinal tubular axis;
    plural hydrophonic devices each generally characterized by a geometric longitudinal hydrophone axis, each said hydrophonic device having an axial bore and a diametric bore wherein said axial bore is disposed generally along said hydrophonic axis and said diametric bore is disposed generally perpendicular to said hydrophonic axis;
    a line generally characterized by a geometric longitudinal linear axis that is approximately coincident with said tubular axis, said line having an at least substantially braided configuration; and
    plural pins;
    wherein said hydrophonic devices, said line and said pins are situated inside said tube, said line passing through said axial bores of said hydrophonic devices, said hydrophonic devices being approximately aligned with each other so that the corresponding said hydrophonic axes are approximately coincident with said tubular axis, said pins each being associated with said line and a said hydrophonic device so that said hydrophonic devices are each fastened with respect to said line, each said pin passing through said line and through said diametric bore of the corresponding said hydrophonic device;
    wherein said tube is characterized by a tubular length and two tubular ends, said tube being smooth in two end portions of said length, said end portions being proximate said two tubular ends, said tube having generally circumferential folds in a medial portion of said length, said medial portion being between said two end portions, said circumferential folds being one of corrugations and convolutions.

2. The acoustic apparatus according to claim 1, wherein said line includes plural strands that are generally adaptable to sufficient separation with respect to each other for permitting each said pin to pass through said line.

3. The acoustic apparatus according to claim 1, wherein said hydrophonic devices:

are approximately equally spaced apart from each other; each generally describe a cylindrical shape; and each include sensory means and preamplification means.

4. The acoustic apparatus according to claim 1, wherein: said acoustic apparatus further comprises two headers; said line has two linear ends; each said header engages said tube at a said tubular end; and said headers hold said line at said two linear ends.

5. The acoustic apparatus according to claim 4, wherein said tube contains oil, and wherein said headers seal said tube so as to prevent egress of oil and ingress of water with respect to said tube.

6. The acoustic apparatus according to claim 5, wherein said acoustic apparatus further comprises plural electrically conductive wires adaptable to electrical connection with a telemetric receiving station, and wherein at least one said header is provided with at least one hole for permitting at least some said wires to pass through said header for effecting said electrical connection.

7. The acoustic apparatus according to claim 6, wherein said acoustic apparatus further comprises an interior sleeve, and wherein said interior sleeve:
is generally characterized by a geometric longitudinal interior sleeve axis that is approximately coincident with said tubular axis;
has an at least substantially mesh configuration; and
is situated inside said tube and outside said hydrophonic devices, said line and said pins.

8. The acoustic apparatus according to claim 7, wherein said acoustic apparatus further comprises a fairing combination, and wherein:
said fairing combination includes an exterior sleeve and plural ribbons;
said ribbons are arranged outside said exterior sleeve for imparting a selected hydrodynamic character to said acoustic apparatus;
said exterior sleeve is generally characterized by a geometric longitudinal exterior sleeve axis that is approximately coincident with said tubular axis;
said exterior structure has an at least substantially mesh configuration; and
said fairing combination is situated outside said tube.

9. The acoustic apparatus according to claim 6, wherein said circumferential folds attribute said tube with a kinking-resistant character.

10. The acoustic apparatus according to claim 1, wherein said circumferential folds attribute said tube with a kinking-resistant character.

11. Acoustic apparatus comprising at least one elongate structure and plural acoustic devices, each said elongate structure having a geometric longitudinal axis, plural said acoustic devices being situated inside each said elongate structure and being aligned along said geometric longitudinal axis, each said elongate structure including a hose, a pair of headers, and a pair of joints, said hose having a main section and two cuffed end sections, said main section having circumferential folds for preventing kinking of said main section, each said header plugging a said cuffed end section, each said joint being attached to a said header.

12. The acoustic apparatus defined in claim 11, wherein said cuffed end sections are smooth, said joints are flexible, and said folds are one of convolutions and corrugations.

13. The acoustic apparatus defined in claim 12, wherein each said elongate structure further includes, situated inside said hose, an elongate strength member and plural fasteners, said strength member connecting said pair of said headers, said strength member being at least substantially characterized by a braided configuration so as to be permit the disposition therethrough of said fasteners, each said fastener fastening a said acoustic device with respect to said strength member.

14. The acoustic apparatus defined in claim 12, wherein each said elongate structure is adaptable to containment of an acoustically suitable fluid so that said acoustically suitable fluid is sealed inside said structure and so that ambient fluid is sealed outside said structure.

15. The acoustic apparatus defined in claim 12, said acoustic apparatus further comprising an acoustically suitable fluid that is contained by said structure, said acoustically suitable fluid being sealed inside said structure so that ambient fluid is sealed outside said structure.

16. The acoustic apparatus defined in claim 12, said acoustic apparatus comprising plural said elongate structures and further comprising a pair of frames, each said elongate structure being interposed between said frames so that one said joint connects said elongate structure to one said frame and so that the other said joint connects said elongate structure to the other said frame, said acoustic apparatus having a pliable quality associated with the kinking preventiveness of said main section of each said elongate structure and associated with and the flexibility of said joints of each said elongate structure, said pliable quality facilitating storage of said apparatus.

17. Acoustic apparatus comprising plural acoustic sensors, a hose, two headers, and two connective lines, said hose being characterized by a geometric longitudinal axis and encompassing said acoustic sensors, said acoustic sensors being arrayed along said geometric longitudinal axis, said hose including a longitudinally intermediate portion and two longitudinally extreme portions, said intermediate portion of said hose being at least substantially characterized by an uneven kinking-preventative shape selected from the group consisting of convoluted and corrugated, said extreme portions of said hose each being at least substantially characterized by an even connection-facilitative shape, each said header fitting inside a said extreme portion of said hose, each said connective line being at least substantially characterized by flexibility and being capable of connecting a said header with a body.

18. The acoustic apparatus of claim 17 wherein said acoustic apparatus further comprises an elongate strength member and plural fasteners, said hose encompassing said elongate strength member and said fasteners, said elongate strength member being situated along said geometric longitudinal axis and being connected at its ends to said headers, said elongate strength member being at least substantially characterized by a braided configuration so as to permit the disposition therethrough of said fasteners, each said fastener being for fastening a said acoustic sensor with respect to said elongate strength member.

19. The acoustic apparatus of claim 17, said acoustic apparatus further comprising an acoustically suitable fluid sealed inside said hose by said headers, said acoustic apparatus being capable of use in an environmental aqueous fluid so that said environmental aqueous fluid is sealed outside said hose by said headers.

20. The acoustic apparatus of claim 17, said acoustic apparatus further comprising electrical conduction means, a portion of said electrical conduction means being encompassed by said hose, said electrical conduction means being for transmitting data from said acoustic sensors to data acquisition means.

* * * * *